(12) United States Patent
Hamamoto et al.

(10) Patent No.: US 10,890,126 B2
(45) Date of Patent: Jan. 12, 2021

(54) METHOD FOR CONTROLLING INTERNAL COMBUSTION ENGINE AND DEVICE FOR CONTROLLING INTERNAL COMBUSTION ENGINE

(71) Applicants: NISSAN MOTOR CO., LTD., Yokohama (JP); RENAULT S. A. S., Boulogne-Billancourt (FR)

(72) Inventors: Takayuki Hamamoto, Kanagawa (JP); Hirofumi Tsuchida, Kanagawa (JP); Daisuke Suzuki, Kanagawa (JP)

(73) Assignees: NISSAN MOTOR CO., LTD., Yokohama (JP); RENAULT S. A. S., Boulogne-Billancourt (FR)

( * ) Notice: Subject to any disclaimer, the term of this patent is extended or adjusted under 35 U.S.C. 154(b) by 0 days.

(21) Appl. No.: 16/476,946

(22) PCT Filed: Jan. 16, 2017

(86) PCT No.: PCT/JP2017/001172
§ 371 (c)(1),
(2) Date: Jul. 10, 2019

(87) PCT Pub. No.: WO2018/131152
PCT Pub. Date: Jul. 19, 2018

(65) Prior Publication Data
US 2019/0353109 A1    Nov. 21, 2019

(51) Int. Cl.
*F02D 41/00*    (2006.01)
*F02M 26/06*    (2016.01)
(Continued)

(52) U.S. Cl.
CPC ........... *F02D 41/0007* (2013.01); *F02D 9/02* (2013.01); *F02D 41/0077* (2013.01); *F02M 26/06* (2016.02); *F02M 26/15* (2016.02); *F02D 2009/022* (2013.01); *F02D 2009/0272* (2013.01); *F02D 2009/0281* (2013.01);
(Continued)

(58) Field of Classification Search
CPC ........ F02D 41/0007; F02D 2041/0017; F02D 41/0077; F02D 41/0052; F02D 41/22; F02D 9/02; F02D 9/2009; F02D 9/0201; F02D 2009/022; F02D 2009/0272; F02D 2009/0281; F02D 2009/0298; F02M 26/06; F02M 26/10; F02M 26/15
See application file for complete search history.

(56) References Cited

FOREIGN PATENT DOCUMENTS

DE    41 41 169 A1    6/1993
EP    1 193 388 A2    4/2002
(Continued)

*Primary Examiner* — Jesse S Bogue
*Assistant Examiner* — Loren C Edwards
(74) *Attorney, Agent, or Firm* — Foley & Lardner LLP

(57) ABSTRACT

A control method for an internal combustion engine including: setting a target valve opening degree of the first throttle valve in accordance with a load, sensing a valve opening degree of the second throttle valve, judging whether or not the valve opening degree of the second throttle valve is an opening degree on a closing side relative to a predetermined set valve opening degree, and correcting the valve opening degree of the first throttle valve to the opening degree on the closing side relative to the target valve opening degree when it is judged that the valve opening degree of the second throttle valve is the opening degree on the closing side relative to the predetermined set valve opening degree.

11 Claims, 3 Drawing Sheets

(51) Int. Cl.
*F02M 26/15* (2016.01)
*F02D 9/02* (2006.01)

(52) U.S. Cl.
CPC ............... *F02D 2009/0298* (2013.01); *F02D 2041/0017* (2013.01)

(56) References Cited

FOREIGN PATENT DOCUMENTS

| JP | 2002-106398 A | 4/2002 |
| JP | 2007-211719 A | 8/2007 |
| JP | 2010-242640 A | 10/2010 |

US 10,890,126 B2

METHOD FOR CONTROLLING INTERNAL COMBUSTION ENGINE AND DEVICE FOR CONTROLLING INTERNAL COMBUSTION ENGINE

TECHNICAL FIELD

This invention relates to a control method for an internal combustion engine and a control device for the internal combustion engine.

BACKGROUND ART

For example, a patent document 1 discloses an exhaust gas purification device for an internal combustion engine with a supercharger. In this exhaust gas purification device, an introduction opening for EGR gas is provided on an upstream side of a compressor. A throttle valve is disposed on the upstream side of this introduction opening. The throttle valve is arranged to adjust a mixture ratio between the flesh air and the EGR. Moreover, a control valve is disposed on a downstream side of the compressor.

In the patent document 1, the control valve is controlled in accordance with a driving state of the engine in a manner substantially similar to the throttle valve. The control valve is controlled to be fully closed at a start and a stop.

However, the patent document 1 does not disclose operation when the throttle valve is failed (malfunctioned).

PRIOR ART DOCUMENT

Patent Document

Patent Document 1: Japanese Patent Application Publication No. 2002-106398

SUMMARY OF THE INVENTION

In a control method of an internal combustion engine according to the present invention, a valve opening degree of a first throttle valve arranged to control an intake air amount is controller to be an opening degree on a closing side relative to a target valve opening degree when a valve opening degree of a second throttle valve arranged to control an intake pressure on an upstream side of a supercharger is an opening degree on a closing side relative to a predetermined set valve opening degree.

By the present invention, it is possible to suppress the development of the negative pressure on the downstream side of the second throttle valve due to the malfunction by the failure of the second throttle valve, and so on.

DESCRIPTION OF EMBODIMENTS

Figure 1:
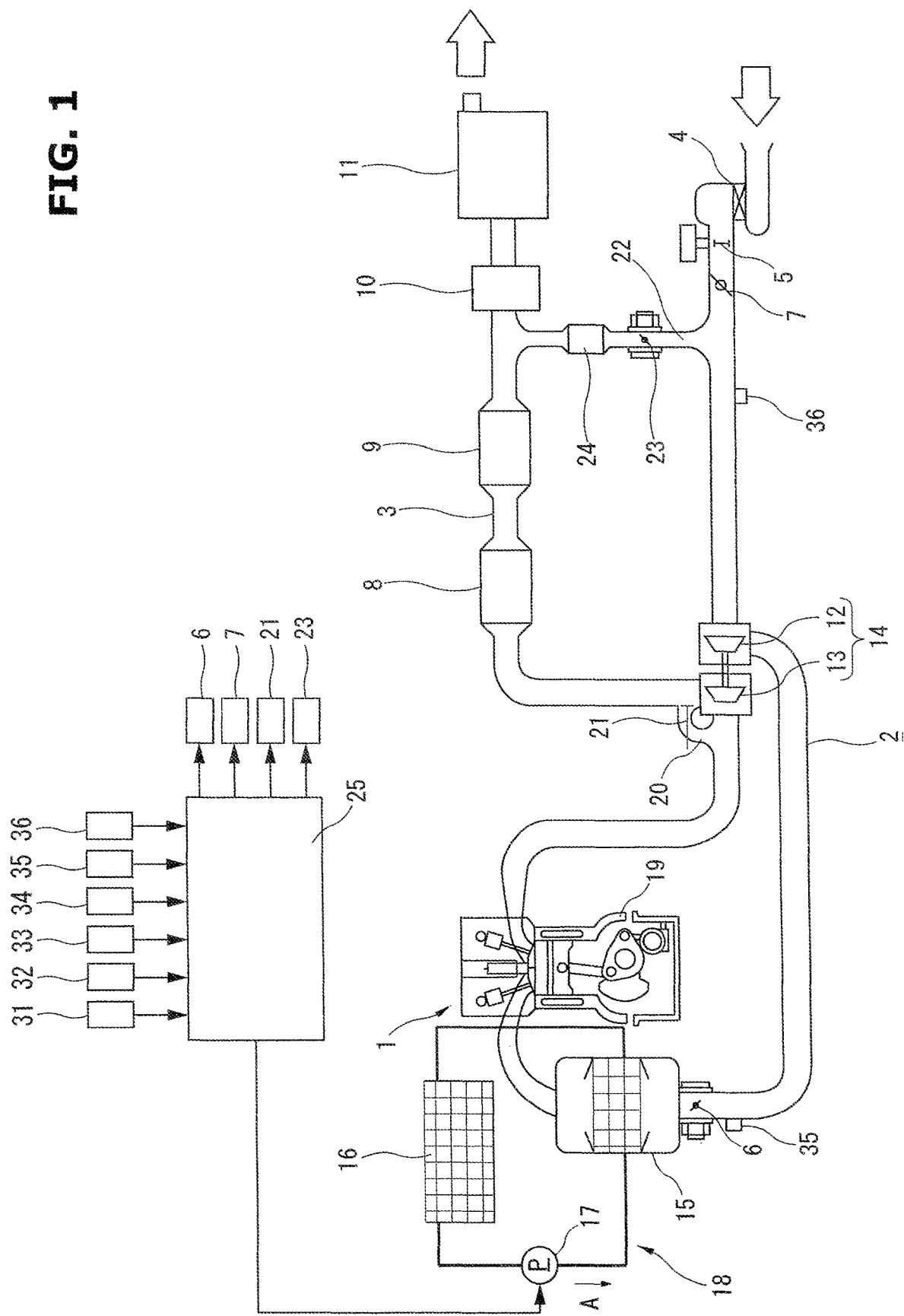
FIG. 1 is an explanation view schematically showing a schematic configuration of a control device for an internal combustion engine according to the present invention.

Hereinafter, one embodiment according to the present invention is explained in detail with reference to the drawings. FIG. 1 is an explanation view schematically showing a schematic configuration of a control device for an internal combustion engine according to the present invention.

An internal combustion engine 1 is mounted, as a driving source, on a vehicle such as an automobile. The internal combustion engine 1 includes an intake passage 2 and an exhaust passage 3.

The intake passage 2 is connected to the internal combustion engine 1. An air cleaner 4, an air flow meter 5, an electromotive first throttle valve 6, and an electromotive second throttle valve 7 are provided to the intake passage 2. The air cleaner 4 is arranged to collect (catch) foreign objects in the intake air. The air flow meter 5 is arranged to sense an intake air amount. The second throttle valve 7 is positioned on an upstream side of the first throttle valve 6.

The air flow meter 5 is disposed on the upstream side of the second throttle valve 7. The air cleaner 4 is disposed on the upstream side of the air flow meter 5. The first throttle valve 6 is arranged to control the intake air amount of the internal combustion engine 1 in accordance with a load. The second throttle valve 7 is arranged to control an intake pressure on the upstream side of a compressor 12 (described later). That is, the second throttle valve 7 in this embodiment is arranged to control a negative pressure on the upstream side of the compressor 12 (described later).

A passage opening area of the first throttle valve 6 at a predetermined fully closed position is set to be smaller than a passage opening area of the second throttle valve 7 at a predetermined fully closed position. That is, the passage opening area of the second throttle valve 7 at the predetermined fully closed position is set to be greater than the passage opening area of the first throttle valve 6 at the predetermined fully closed position.

The exhaust passage 3 is connected to the internal combustion engine 1. An upstream side exhaust catalyst 8, a downstream side exhaust catalyst 9, an underfloor catalyst 10, and a muffler 11 are provided to the exhaust passage 3. The upstream side exhaust catalyst 8 is a three-way catalyst and so on. The downstream side exhaust catalyst 9 is a three-way catalyst and so on. The underfloor catalyst 10 is a three-way catalyst and so on. The muffler 11 is arranged to decrease the exhaust noise.

The downstream side exhaust catalyst 9 is disposed on the downstream side of the upstream side exhaust catalyst 8, on the upstream side of the underfloor catalyst 10. The underfloor catalyst 10 is disposed on the downstream side of the downstream side exhaust catalyst 9. The muffler 11 is disposed on the downstream side of the underfloor catalyst 10.

This internal combustion engine 1 includes a turbo supercharger 14 which is a supercharger, and which includes a compressor 12 provided to the intake passage 2, and a turbine 13 provided to the exhaust passage 3, and disposed coaxially with the compressor 12. The compressor 12 is positioned on the upstream side of the first throttle valve 6, on the downstream side of the second throttle valve 7. The turbine 13 is disposed on the upstream side of the upstream side exhaust catalyst 8.

Moreover, an intercooler 15 is provided to the intake passage 2 on the downstream side of the first throttle valve 6. The intercooler 15 is arranged to cool the intake air compressed by the compressor 12, and to thereby improve the charging efficiency (filling efficiency).

The intercooler 15, a radiator 16 for the intercooler (intercooler radiator), and an electromotive pump 17 are disposed in an intercooler cooling passage (sub cooling passage) 18. The intercooler 15 is arranged to receive a refrigerant (cooling water) cooled by the radiator 16.

The intercooler cooling passage 18 is arranged to circulate the refrigerant within the passage. The intercooler cooling passage 18 is a cooling passage independently of a main cooling passage (not shown) within which the cooling water for cooling a cylinder block 19 of the internal combustion engine 1 is circulated.

The radiator 16 is arranged to cool the refrigerant within the intercooler cooling passage 18, by heat exchange between the refrigerant and the outside air.

The electromotive pump 17 is arranged to be driven to circulate the refrigerant between the radiator 16 and the intercooler 15 in a direction of an arrow A.

An exhaust bypass passage 20 is connected to the exhaust passage 3. The exhaust bypass passage 20 bypasses (circuits) the turbine 13. The exhaust bypass passage 20 connects the upstream side and the downstream side of the turbine 13. The exhaust bypass passage 20 includes a downstream side end connected to the exhaust passage 3 at a positon on the upstream side of the upstream side exhaust catalyst 8. An electromotive waste gate valve 21 is disposed to the exhaust bypass passage 20. The waste gate valve 21 is arranged to control an exhaust flow rate within the exhaust bypass passage 20.

Moreover, the internal combustion engine 1 is arranged to perform an exhaust gas recirculation (EGR) to introduce (recirculate), as EGR gas, part of the exhaust gas from the exhaust passage 3, to the intake passage 2. The internal combustion engine 1 includes an EGR passage 22 which is bifurcated from the exhaust passage 3, and connected to the intake passage 2. The EGR passage 22 includes one end connected to the exhaust passage 3 at a position between the downstream side exhaust catalyst 9 and the underfloor catalyst 10, and the other end connected to the intake passage 2 at a positon which is on the downstream side of the second throttle valve 7, and which is on the upstream side of the compressor 12. An electromotive EGR valve 23 and an EGR cooler 24 are provided to the EGR passage 22. The EGR valve 23 is arranged to adjust (regulate) the EGR gas flow rate within the EGR passage 22. The EGR cooler 24 is arranged to cool the EGR gas.

In this case, the opening and closing operations of the first throttle valve 6, the second throttle valve 7, and the EGR valve 23 are controlled by a control unit 25 which is a control section. The control unit 25 is a known digital computer including a CPU, a ROM, a RAM, and an input and output interface.

The control unit 25 is configured to receive the detection signal (detection value) of the above-described air flow meter 5. Moreover, the control unit 25 is configured to receive detection signals (detection values) of various sensors such as a crank angle sensor 31 arranged to sense a crank angle of a crank shaft (not shown), and an engine speed, an accelerator opening degree sensor 32 arranged to sense an accelerator pedal depression amount (accelerator opening degree APO) indicative of a desired load state of the internal combustion engine 1, a first throttle opening degree sensor 33 which is a first throttle valve opening degree sensing section arranged to sense a valve opening degree of the first throttle valve 6, a second throttle opening degree sensor 34 which is a second throttle valve opening degree sensing section arranged to sense a valve opening degree of the second throttle valve 7, a first pressure sensor 35 arranged to sense the intake pressure on the downstream side of the compressor 12, and a second pressure sensor 36 arranged to sense the intake pressure on the downstream side of the second throttle valve 7. The first pressure sensor 35 is arranged to sense the intake pressure which is on the upstream side of the first throttle valve 6, and which is on the downstream side of the compressor 12. The second pressure sensor 36 is arranged to sense the intake pressure which is on the upstream side of the compressor 12, and which is on the downstream side of the second throttle valve 7.

Besides, the control unit 25 is configured to control an ignition timing and an air fuel ratio of the internal combustion engine 1, to control to drive the electromotive pump 17, and to control the valve opening degree of the waste gate valve 21, based on the above-described detection signals (the detection values).

For example, a target valve opening degree of the first throttle valve 6 is calculated to attain a desired torque calculated based on the operation amount of the accelerator pedal by the driver, and so on.

For example, a target valve opening degree of the second throttle valve 7 is calculated at each timing based on the intake pressure necessary for the downstream side of the second throttle valve 7.

In a driving condition in which a predetermined amount of the EGR gas is introduced into the intake passage 2, it is necessary to set an EGR introduction opening intake pressure which is the intake pressure (negative pressure) that is on the downstream side of the second throttle valve 7 so that the target EGR gas amount can be introduced into the intake passage 2. Accordingly, the target valve opening degree of the second throttle valve 7 is calculated by a predetermined operational expression using this EGR introduction opening intake pressure. This calculation is repeatedly performed in a short cycle (for example, an interval of several ms to several hundred ms). The EGR introduction opening intake pressure is set from an opening characteristic of the first throttle valve 6, and so on. The target valve opening degree of the second throttle valve 7 may be obtained by referring to a previously prepared map associated with the desired torque and so on.

The target valve opening degrees of the first throttle valve 6 and the second throttle valve 7 are calculated in the control unit 25.

In this embodiment, in the valve opening degree of the second throttle valve 7, a movement in the valve closing direction from a predetermined fully closed positon is restricted by a stopper mechanism 41.

Figure 2:
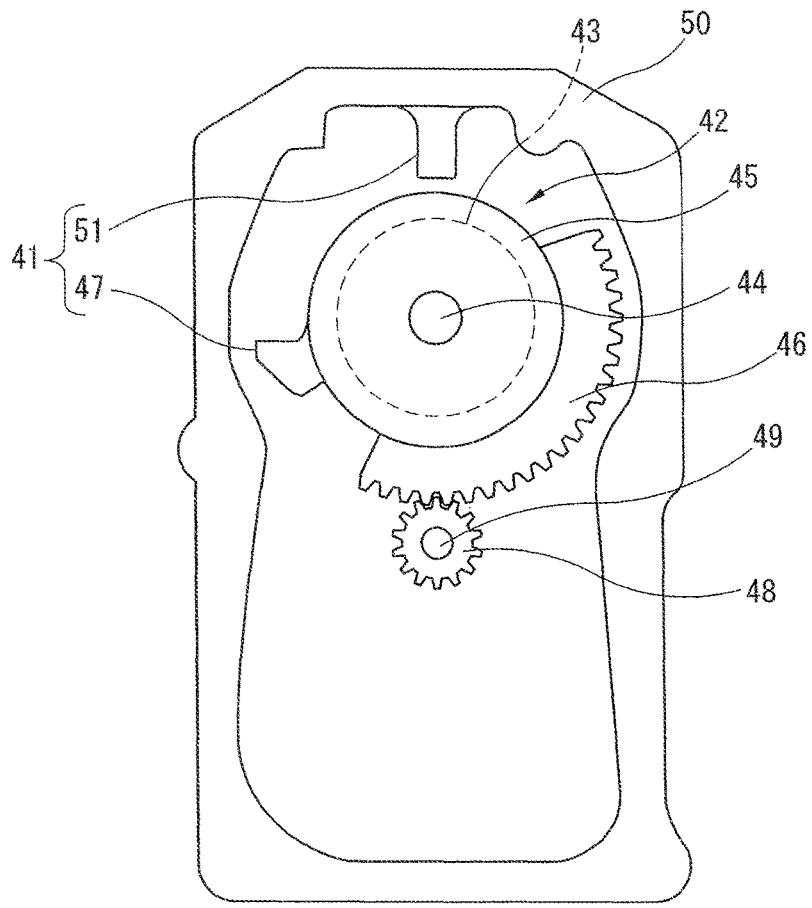
FIG. 2 is an explanation view schematically showing an outline of a stopper mechanism.

FIG. 2 is an explanation view schematically showing an outline of the stopper mechanism 41. The stopper mechanism 41 includes a closing side stopper portion 47 which is a stopper portion provided to a first gear 42, and a closing side stopper piece portion 51 which is a stopper piece portion protruding from an inner wall surface of a housing 50.

The first gear 42 is fixed to a rotation shaft 44 of a motor 43 which is a driving source for the second throttle valve 7. The first gear 42 includes a main body portion 45 which has a circular plate shape, and which is disposed coaxially with a rotation shaft 44; and a gear portion 46 and the closing side stopper portion 47 which are provided on an outer circumference of the main body portion 45.

The entire gear portion 46 has an arc shape. The gear portion 46 is provided on a part of the outer circumference of the main body portion 45. The gear portion 46 includes an outer circumference including a plurality of teeth engaged with a second gear 48.

The closing side stopper 47 is formed on a portion of the outer circumference of the main body portion 45 on which the gear portion 46 is not formed.

The second gear 48 is fixed on a valve shaft 49 of the second throttle valve 7. The second gear 48 has a circular plate shape. The second gear 48 is disposed coaxially with the valve shaft 49. A plurality of teeth are formed on an overall outer circumference of the second gear 48. The plurality of the teeth of the second gear 48 are engaged with the teeth of the gear portion 46 of the first gear 42.

The housing 50 receives the first gear 42, and the second gear 48 engaged with the first gear 42.

The closing side stopper piece portion 51 is formed at a position at which the closing side stopper 47 is abutted on the closing side stopper piece portion 51 when the second throttle valve 7 is positioned at the predetermined fully closed positon.

The closing side stopper piece portion 51 is integral with the housing 50. The closing side stopper piece portion 51 is arranged to restrict the rotation of the first gear 42 so that the first gear 42 is not further rotated in the closing direction when the closing side stopper portion 47 is abutted on the closing side stopper piece portion 51. That is, the stopper mechanism 41 is arranged to stop the rotation of the first gear 42 in the valve closing direction of the second throttle valve 7 when the closing side stopper portion 47 is abutted on the closing side stopper piece portion 51. That is, when the closing side stopper portion 47 is abutted on the closing side stopper piece portion 51, the rotation of the second gear 48 is stopped, so as to stop the rotation of the valve shaft 49 of the second throttle valve 7 which is arranged to rotate as a unit with the second gear 48.

In the above-described embodiment, it is possible to control the negative pressure on the downstream side of the second throttle valve 7 by controlling the second throttle valve 7. Accordingly, it is possible to introduce the EGR gas into the intake passage 2 even in a driving region in which a pressure difference between the intake passage 2 and the exhaust passage 3 is small, for example, in a low load and low rotation speed region.

However, the negative pressure is suddenly developed when the valve opening degree of the second throttle valve 7 is the closing side opening degree relative to (with respect to) the target valve opening degree due to the malfunction by the failure and so on, in a driving region in which the sufficient pressure difference is generated between the intake passage 2 and the exhaust passage 3, for example, in a high load and high rotation speed region. Accordingly, the excessive rotation of the turbo supercharger 14 and the oil leakage from a portion (for example, the oil seal portion of lubricating seal component and so on of the turbo supercharger 14) may be generated.

Accordingly, in this embodiment, when the valve opening degree of the second throttle valve 7 is the closing side opening degree relative to the target valve opening degree of the second throttle valve 7, a first throttle valve opening degree correction is performed by controlling the valve opening degree of the first throttle valve 6 to the opening degree on the closing side relative to the target valve opening degree of the first throttle valve.

With this, it is possible to suppress the excessive development of the negative pressure on the downstream side of the second throttle valve 7 at the malfunction due to the failure of the second throttle valve 7, and so on.

Therefore, it is possible to suppress the excessive rotation of the turbo supercharger 14 (the compressor 12) positioned on the downstream side of the second throttle valve 7, and to suppress the oil leakage from the oil seal portion which is located on the downstream side of the second throttle valve 7.

In a case where the valve opening degree of the second throttle valve 7 is the opening degree on the closing side relative to the target valve opening degree, the negative pressure is developed when the passage opening area of the first throttle valve 6 is greater than the passage opening area of the second throttle valve 7.

Accordingly, when the first throttle valve opening degree correction is performed, the passage opening area of the first throttle valve 6 is controlled to be smaller than the passage opening area of the second throttle valve 7.

With this, it is possible to suppress the development of the negative pressure, to improve the reliability of the function at the malfunction due to the failure and so on of the second throttle valve 7, and to perform the secure and reliable failsafe.

Moreover, when the first throttle valve opening degree correction is performed, the EGR valve 23 is closed to stop the EGR.

With this, it is possible to avoid the engine stall generated by the excessive flow of the EGR gas into the intake passage 2.

Figure 3:
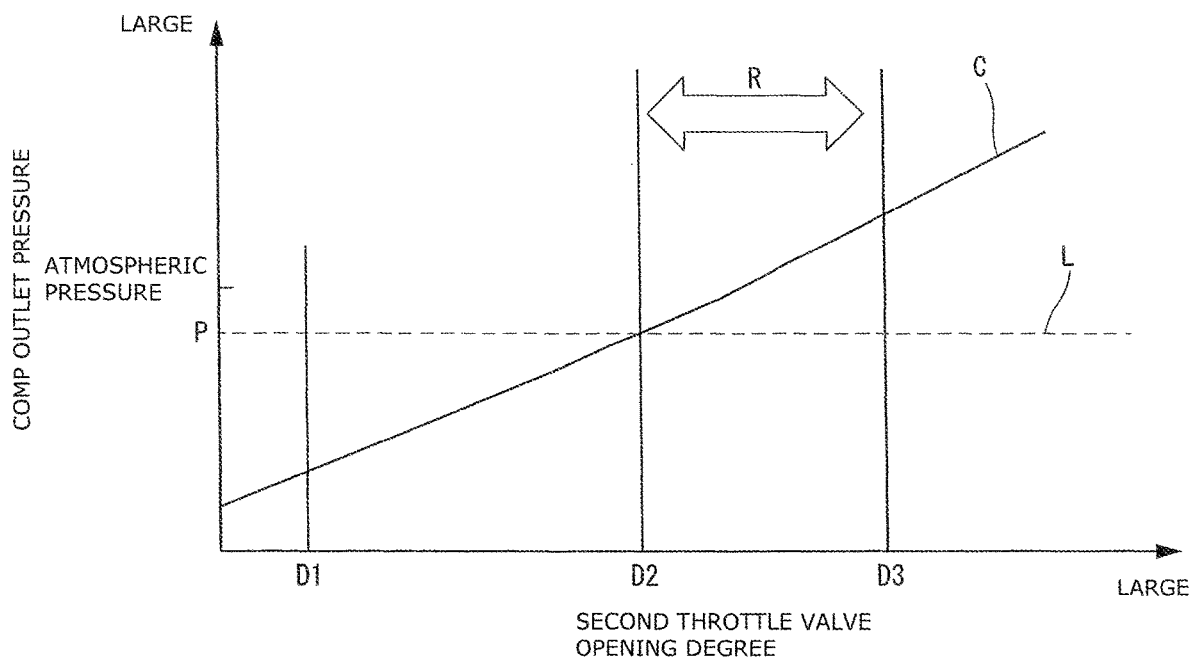
FIG. 3 is a characteristic view showing a relationship between a valve opening degree of a second throttle valve and an intake pressure at a compressor outlet.

Moreover, in the above-described embodiment, the predetermined fully closed positon of the second throttle valve 7 which is restricted by the stopper mechanism 41 is set to, for example, a range R from an opening degree D2 to an opening degree D3 in FIG. 3.

A characteristic line C shown by a solid line in FIG. 3 shows a relationship between the intake pressure of the outlet of the compressor 12, and the valve opening degree of the second throttle valve 7 with respect to the valve opening degree of the first throttle valve 6 when the driving region is the high load and high rotation speed region. A broken line L in FIG. 3 shows pressure P by which the oil leakage may be generated from the portion (for example, the oil seal portion such as the lubrication seal components of the turbo supercharger 14) which is positioned on the downstream side of the second throttle valve 7 to seal the oil. When the intake pressure of the outlet of the compressor 12 is smaller than this pressure P, that is, when the negative pressure smaller than the pressure P is developed, the oil leakage is generated due to the influence of the negative pressure. That is, the pressure P is a negative pressure limit value (negative pressure threshold value) at the oil seal portion which is positioned on the downstream side of the second throttle valve 7.

An opening degree D1 is a valve opening degree of the second throttle valve 7 at which the engine stall is caused. When the valve opening degree of the second throttle valve 7 becomes equal to or smaller than D1, the engine stall is generated due to the deficiency of the air volume (amount).

The opening degree D2 is a valve opening degree at which the characteristic line C and the broken line L are intersected.

The opening degree D3 is a valve opening degree which is greater than the opening degree D2 by a predetermined amount, and which is set in consideration of the variation of the stopper mechanism 41.

By setting the fully closed position of the second throttle valve 7 by the stopper mechanism 41, even when the malfunction of the second throttle valve 7 is generated due to the failure and so on, it is possible to surely avoid the engine stall due to the deficiency of the air volume, and the oil leakage on the downstream side of the second throttle valve 7 due to the development of the excessive negative pressure.

Moreover, the passage opening area of the first throttle valve 6 at the fully closed position is set to be smaller than the passage opening area of the second throttle valve 7 at the fully closed position.

With this, even when the valve opening degree of the second throttle valve 7 becomes the fully closed position due to the malfunction by the failure and so on, it is possible to decrease the passage opening area of the first throttle valve 6 to be smaller than the passage opening area of the second throttle valve 7, by decreasing the valve opening degree of the first throttle valve 6. Accordingly, it is possible to suppress the development of the negative pressure, to improve the function reliability at the malfunction by the failure and so on of the second throttle valve 7, and to attain the secure and sure failsafe.

Furthermore, at the failure of the first throttle valve 6, the opening degree of the first throttle valve 6 is restricted (controlled) so as to supply a minimum air necessary for the traveling of the vehicle. At this time, in a case where the second throttle valve 7 is controlled so that the passage opening area of the second throttle valve 7 becomes greater than the passage opening area of the first throttle valve 6, it is surely prevent the engine stall.

Figure 4:
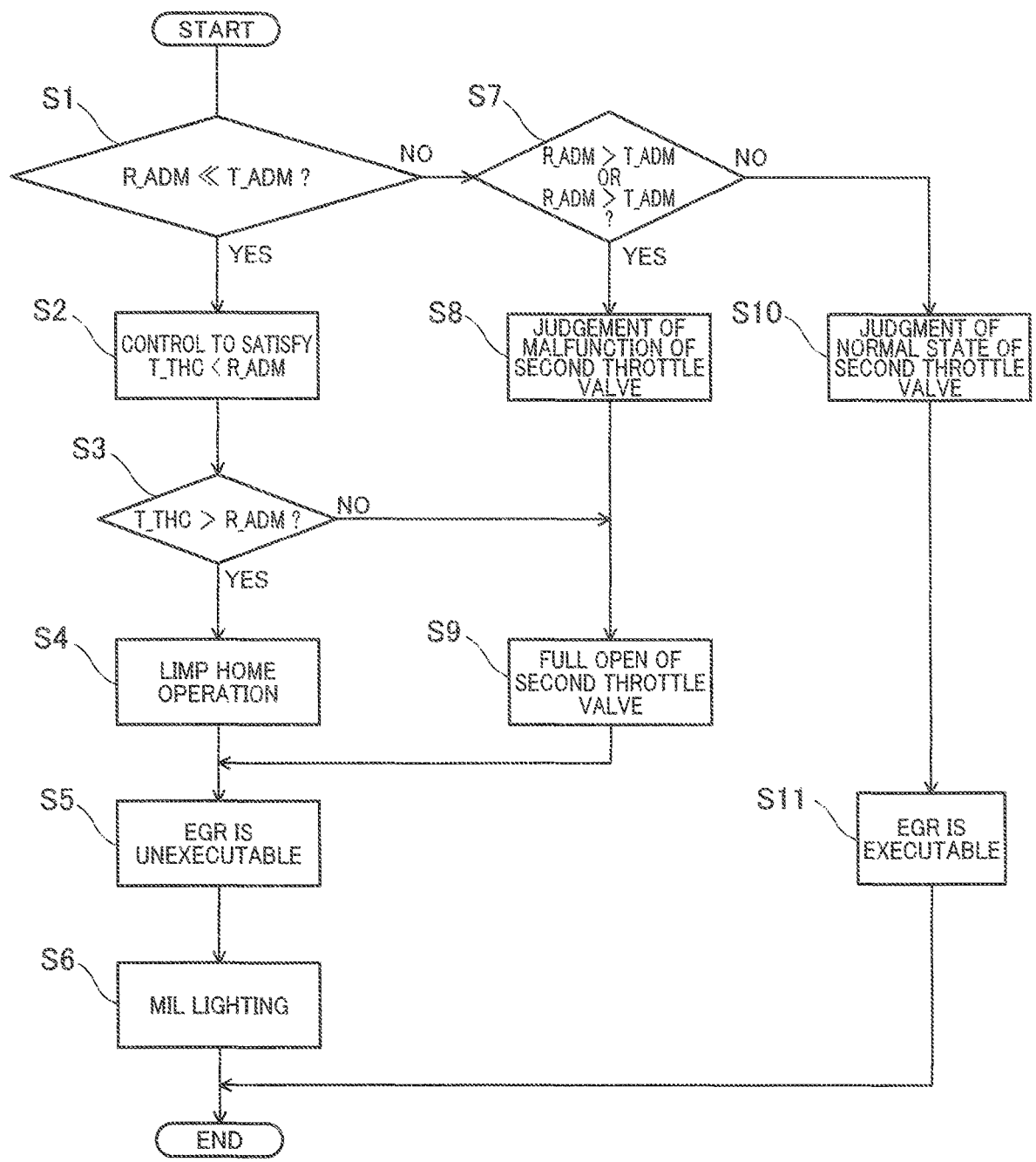
FIG. 4 is a flowchart showing a flow of a control of the internal combustion engine.

FIG. 4 is a flowchart showing one example of a flow of the control of the internal combustion engine 1 according to this embodiment.

At step S1, it is judged whether or not an actual valve opening degree R_ADM of the second throttle valve 7 is extremely smaller than a target valve opening degree T_ADM of the second throttle valve 7. When the actual valve opening degree R_ADM is extremely smaller than the target valve opening degree T_ADM, the process proceeds to step S2. When this is not satisfied, the process proceeds to step S7. That is, when the actual valve opening degree R_ADM of the second throttle valve 7 is so small to be out of a predetermined variation relative to the target valve opening degree T_ADM of the second throttle valve 7, the process proceeds to step S2. When this is not satisfied, the process proceeds to step S7. The actual valve opening degree R_ADM of the second throttle valve 7 can be sensed by the second throttle opening degree sensor 34. Moreover, the actual valve opening degree R_ADM of the second throttle valve 7 can be calculated by using the detection signal (the detection value) of the second pressure sensor 36.

At step S2, the target valve opening degree T_THC of the first throttle valve 6 is controlled to be smaller than the actual valve opening degree R_ADM of the second throttle valve 7. That is, the control is performed so that the passage opening area of the first throttle valve 6 is smaller than the passage opening area of the second throttle valve 7.

At step S3, it is judged whether or not the target valve opening degree T_THC of the first throttle valve 6 is greater than the actual valve opening degree R_ADM of the second throttle valve 7. When target valve opening degree T_THC of the first throttle valve 6 is greater than the actual valve opening degree R_ADM of the second throttle valve 7, the process proceeds to step S4. When this is not satisfied, the process proceeds to step S9.

At step S4, a limp home operation is performed by an output limitation of the internal combustion engine 1 to leave the output for the vehicle to be able to perform the retreat traveling (turnout travel) by itself. That is, the valve opening degree of the first throttle valve 6 is limited to an opening degree by which it is possible to obtain the output for the vehicle to be able to travel by itself.

At step S5, the EGR is set to be unexecutable. This is because the EGR cannot be controlled when the malfunction is generated in the second throttle valve 7 due to the failure and so on.

At step S6, a warning lamp (MIL) is lightened. The warning lamp is provided at a position which can be viewed from a driver's seat, for example, an instrument panel of the driver's seat. The warning lamp is arranged to inform the driver that the second throttle valve 7 is in the abnormal state.

At step S7, it is judged whether or not the actual valve opening degree R_ADM of the second throttle valve 7 is smaller or greater than the target valve opening degree T_ADM of the second throttle valve 7. When the actual valve opening degree R_ADM of the second throttle valve 7 is deviated from the target valve opening degree T_ADM of the second throttle valve 7, the process proceeds to step S8. When this is not satisfied, the process proceeds to step S10.

At step S8, it is judged that the second throttle valve 7 is failed (in the failure state).

At step S9, the second throttle valve 7 is commanded (controlled) so that the valve opening degree becomes the full open.

At step S10, it is judged that the second throttle valve 7 is in the normal state.

At step S11, the EGR is set to be executable.

Besides, in the above-described embodiment, an elastic member such as a return spring (not shown) may be provided so as to constantly act a force to move the valve opening degree of the second throttle valve 7 in the valve opening direction, to the first gear 42 or the second gear 48.

In a case where the second throttle valve 7 is constantly urged in the valve opening direction by the above-described elastic member, an initial setting (default) of the valve opening degree of the second throttle valve 7 is full open. That is, in this case, the valve opening degree of the second throttle valve 7 is full open in a state where the control signal is not outputted to the second throttle valve 7.

Accordingly, in a case where the initial setting (the default) of the valve opening degree of the second throttle valve 7 is full open, when the exhaust pressure is sufficiently high by the high speed and the high load and so on of the internal combustion engine 1, or when the EGR is not performed, the valve opening degree of the second throttle valve 7 is full open even when the valve opening degree of the second throttle valve 7 is not controlled to be the target value by the control signal.

Therefore, for example, when the initial setting (the default) of the valve opening degree of the second throttle valve 7 is the full open, it is judged whether or not the valve opening degree of the second throttle valve 7 is the closing side relative to the predetermined setting valve opening degree. It is judged that the valve opening degree of the second throttle valve 7 is the opening degree on the closing side relative to the setting valve opening degree, the valve opening degree of the first throttle valve 6 is corrected to the opening degree on the closing side relative to the target valve opening degree. In this case, the setting valve opening degree is a concept (term) including the target valve opening degree of the second throttle valve 7, and the valve opening degree of the initial setting (the default) of the second throttle valve 7.

Moreover, a bypass passage (not shown) to bypass the compressor 12 may be provided to the intake passage 2. Moreover, a recirculation valve (not shown) to recirculate the supercharged air to the bypass passage 37 may be provided to the bypass passage 37.

The above-described embodiment relates to the control method for the internal combustion engine 1 and the control device for the internal combustion engine 1.

The invention claimed is:

1. A control method for an internal combustion engine including
a supercharger positioned on an upstream side of a first throttle valve arranged to control an intake air amount,
a second throttle valve positioned on the upstream side of the supercharger, and arranged to control an intake pressure on the upstream side of the supercharger,
an EGR passage arranged to recirculate a part of an exhaust gas to a portion between the supercharger and the second throttle valve, and
an EGR valve arranged to adjust an EGR gas flow rate flowing in the EGR passage,
the control method comprising:
setting a target valve opening degree of the first throttle valve in accordance with a load,
sensing a valve opening degree of the second throttle valve,
judging whether or not the valve opening degree of the second throttle valve is an opening degree of the second throttle valve on a closing side of the second throttle valve relative to a predetermined set valve opening degree, and
correcting the valve opening degree of the first throttle valve to an opening degree of the first throttle valve on the closing side of the first throttle valve relative to the target valve opening degree when the valve opening degree of the second throttle valve is judged to be the opening degree of the second throttle valve on the closing side of the second throttle valve relative to the predetermined set valve opening degree,
upon the valve opening degree of the first throttle valve being corrected to the opening degree of the first throttle valve on the closing side of the first throttle valve relative to the target valve opening degree, a passage opening area of the first throttle valve is controlled to be smaller than a passage opening area of the second throttle valve.

2. The control method for the internal combustion engine as claimed in claim 1, wherein there is provided a stopper mechanism arranged to restrict a movement of the second throttle valve from a fully closed position of the second throttle valve in a closing direction; and the passage opening area of the first throttle valve in a fully closed position of the first throttle valve is set to be smaller than the passage opening area of the second throttle valve in the fully closed position of the second throttle valve.

3. The control method for the internal combustion engine as claimed in claim 2, wherein the passage opening area of the second throttle valve is controlled to be greater than the passage opening area of the first throttle valve, at a malfunction of the first throttle valve.

4. The control method for the internal combustion engine as claimed in claim 2, wherein upon the valve opening degree of the first throttle valve being corrected to the opening degree of the first throttle valve on the closing side of the first throttle valve relative to the target valve opening degree, the EGR valve is closed to stop an EGR.

5. The control method for the internal combustion engine as claimed in claim 1, wherein the passage opening area of the second throttle valve in a fully closed position of the second throttle valve is set to be equal to or smaller than a negative pressure limit of an oil seal portion positioned on a downstream side of the second throttle valve.

6. The control method for the internal combustion engine as claimed in claim 5, wherein the passage opening area of the second throttle valve is controlled to be greater than the passage opening area of the first throttle valve, at a malfunction of the first throttle valve.

7. The control method for the internal combustion engine as claimed in claim 5, wherein upon the valve opening degree of the first throttle valve being corrected to the opening degree of the first throttle valve on the closing side of the first throttle valve relative to the target valve opening degree, the EGR valve is closed to stop an EGR.

8. The control method for the internal combustion engine as claimed in claim 1, wherein the passage opening area of the second throttle valve is controlled to be greater than the passage opening area of the first throttle valve, at a malfunction of the first throttle valve.

9. The control method for the internal combustion engine as claimed in claim 8, wherein upon the valve opening degree of the first throttle valve being corrected to the opening degree of the first throttle valve on the closing side of the first throttle valve relative to the target valve opening degree, the EGR valve is closed to stop an EGR.

10. The control method for the internal combustion engine as claimed in claim 1, wherein upon the valve opening degree of the first throttle valve being corrected to the opening degree of the first throttle valve on the closing side of the first throttle valve relative to the target valve opening degree, the EGR valve is closed to stop an EGR.

11. A control device for an internal combustion engine, the control device comprising:
a first throttle valve arranged to control an intake air amount of the internal combustion engine in accordance with a load;
a supercharger positioned on an upstream side of the first throttle valve;
a second throttle valve positioned on the upstream side of the first throttle valve;
an EGR passage arranged to recirculate a part of an exhaust gas to a portion between the supercharger and the second throttle valve;
an EGR valve arranged to adjust an EGR gas flow amount flowing in the EGR passage;
a second throttle valve opening degree sensing section arranged to sense a valve opening degree of the second throttle valve; and
a control section configured to control a valve opening degree of the first throttle valve to a valve opening degree of the first throttle valve on a closing side of the first throttle valve relative to a valve opening degree of the first throttle valve determined in accordance with a load, when the valve opening degree of the second throttle valve is judged to be the opening degree of the second throttle valve on the closing side of the second throttle valve relative to a predetermined set valve opening degree,
upon the valve opening degree of the first throttle valve being corrected to the opening degree of the first throttle valve on the closing side of the first throttle valve relative to a target valve opening degree of the first throttle valve, a passage opening area of the first throttle valve is controlled to be smaller than a passage opening area of the second throttle valve.

* * * * *